Oct. 25, 1932.  E. R. MROSS  1,884,120
BASE FOR FOOD MIXER SUPPORTS
Filed Nov. 3, 1930

Inventor:
Edward R. Mross,
By Bertha L. MacGregor
Atty.

Patented Oct. 25, 1932

1,884,120

UNITED STATES PATENT OFFICE

EDWARD R. MROSS, OF RACINE, WISCONSIN, ASSIGNOR TO HAMILTON BEACH MANUFACTURING COMPANY, A CORPORATION

BASE FOR FOOD MIXER SUPPORTS

Application filed November 3, 1930. Serial No. 492,884.

This invention relates to food mixer supports, and more particularly to an improved base for a support for a motor driven mixer.

The main object of the invention is to provide a base in which a support for a food mixer may be removably mounted and upon which a bowl or other container for food ingredients may be held in desired position relative to the mixer, without being fixed to the base.

In using some types of motor driven food mixers there is a tendency for the mixer to draw the bowl or container with its ingredients toward the motor and away from its proper position directly under the beaters. To overcome this objection the construction of the present invention embodies means for holding the container in its intended position, while permitting the user to manually revolve the container as is desirable in order to insure thorough mixing of all the ingredients. The base construction is such that it is adapted to carry containers of various sizes and shapes.

In the drawing—

Figure 1:
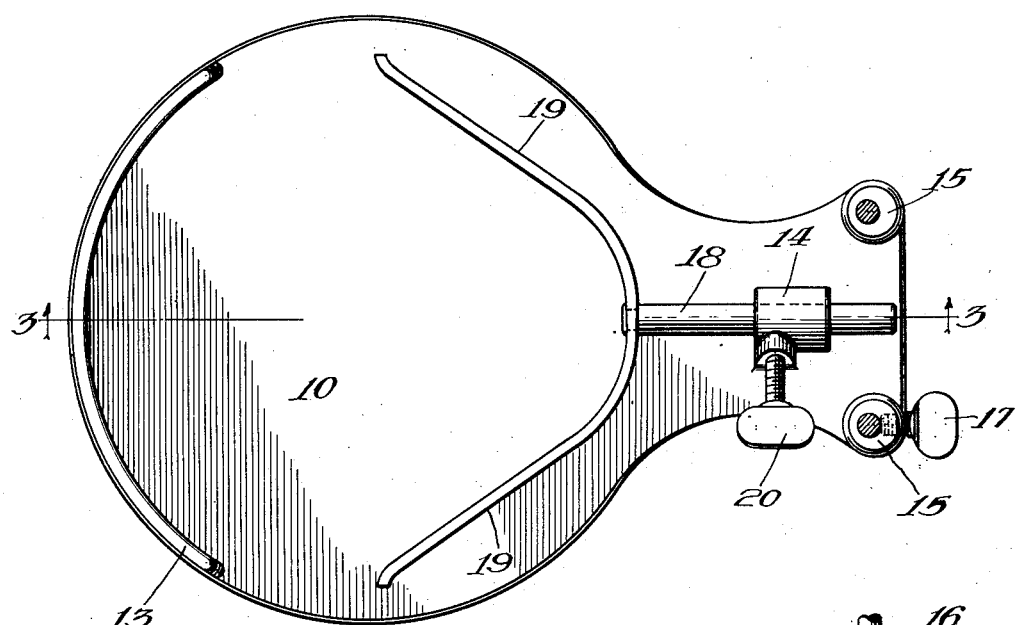
Fig. 1 is a plan view of a base for a motor driven food mixer support embodying my invention.
Figure 2:
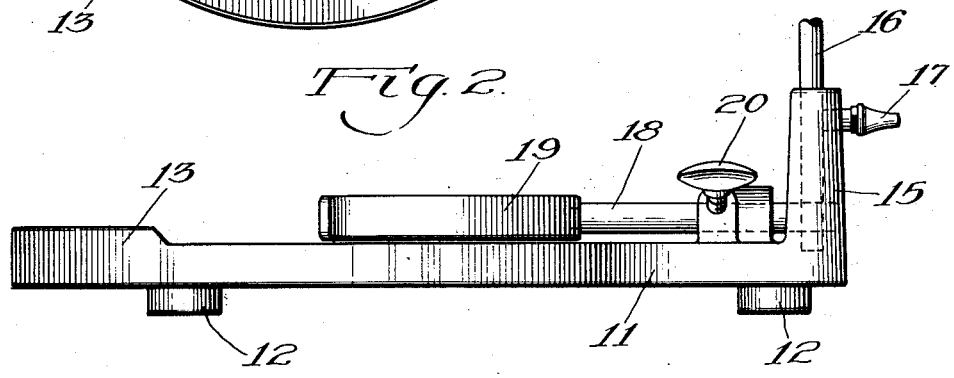
Fig. 2 is a side elevation of the base.
Figure 3:
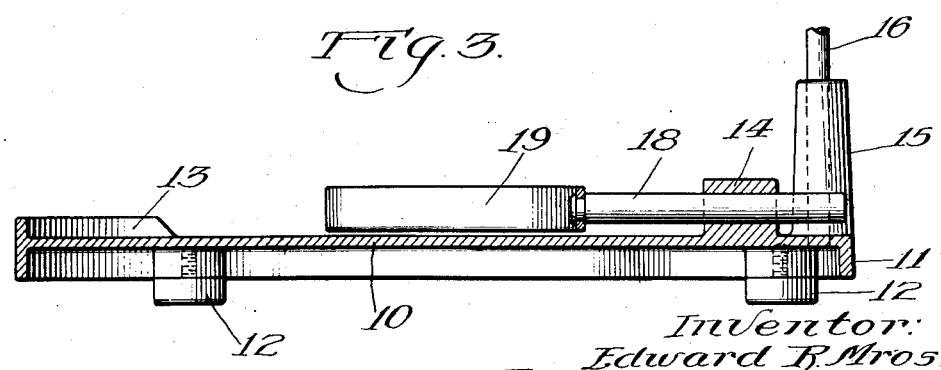
Fig. 3 is a vertical sectional view taken on the line 3—3 of Fig. 1.

In that embodiment of the invention shown in the drawing, 10 indicates the floor of the base which is preferably made of metal and 11 indicates a depending marginal flange. The device may rest on this flange 11 but preferably the base is provided with rubber tipped feet 12 which project below the flange 11.

On its upper surface the floor is provided with a lip 13 which extends around the forward margin of the base approximately 60° toward each side from a longitudinal median line through the base.

A horizontally bored boss 14 extends upwardly a limited distance from the floor 10, midway between its side margins at that end of the base opposite the lip 13. Two cylindrical sockets 15 also extend upwardly from the floor at this end of the base and are adapted to receive rods 16 which are part of the mixer support. The support rods 16 are held in place by a set screw 17.

A yoke comprising a longitudinally extending rod 18 having secured to its forward end, oppositely directed curved arms 19, is adjustably secured to the base slightly above the floor 10. The rod 18 extends through the apertured boss 14 and is retained in desired position therein by the set screw 20.

A bowl for holding the ingredients to be mixed is intended to be positioned on the floor 10 between the yoke arms 19 and lip 13, and the yoke may be adjusted in the boss 14 so that the bowl will be beneath the beater elements of the mixer and will be prevented from moving rearwardly toward the motor of the mixer. The rod 18 may be adjusted in the boss 14 so that the yoke arms 19 will act as a rear stop for the bowl, and the bowl may be manually revolved while bearing against the arms 19 to bring the ingredients into contact with the beater elements.

Obviously the yoke need not be of the exact construction herein shown. Two curved arms similar to the arms 19 might be mounted on a cross pin journalled in a pair of transversely bored bosses.

Other changes may be made in details of construction without departing from the scope of my invention and I do not intend to be limited to the exact form shown and described except as set forth in the appended claims.

I claim:

1. A support for a food mixer comprising a base, spaced motor supporting means on said base, a receptacle clamping yoke carried by said base to secure a receptacle upon said base relative to said motor supporting means, and adjustable means for said yoke carried by said base between said yoke and motor supporting means and movable relative to said base between said motor supporting means.

2. A support for a food mixer comprising a base, a bifurcated motor supporting means on said base, a receptacle clamping yoke carried by said base to position a receptacle upon said base relative to said motor supporting means, and adjustable means for said yoke comprising a horizontally bored boss on said base adjacent said motor supporting means and a rod connected to said yoke and movable through the bore of said boss and between said motor supporting means.

In testimony, that I claim the foregoing as my invention, I affix my signature, this 28 day of October, 1930.

EDWARD R. MROSS.